United States Patent [19]

Hegadorn et al.

[11] Patent Number: 4,487,023

[45] Date of Patent: Dec. 11, 1984

[54] PROCESS FOR PREPARING A GASIFIED ICE PRODUCT

[75] Inventors: Joseph L. Hegadorn, Ridgewood; Steven B. Chall, Marlboro; Richard B. Stevenson, Englishtown, all of N.J.

[73] Assignee: General Foods Corporation, White Plains, N.Y.

[21] Appl. No.: 414,213

[22] Filed: Sep. 2, 1982

[51] Int. Cl.³ ............................................. F25C 1/00
[52] U.S. Cl. ............................................ 62/1; 62/48; 62/69
[58] Field of Search ............... 62/70, 1, 56, 48, 8, 62/69

[56] References Cited

U.S. PATENT DOCUMENTS 3,220,204 12/1965 Adler ................................. 62/70

Primary Examiner—Henry Bennett
Attorney, Agent, or Firm—Thomas R. Savoie; Daniel J. Donovan; Joseph T. Harcarik

[57] ABSTRACT

The invention provides an improved process for preparing gasified ice products; particularly, a process is provided which more efficiently produces gasified ice products having good mechanical strength and provides uniform gas contents on a reproducible basis.

According to the present invention, the reaction between a conditionally-stable-hydrate-forming gas and water is maintained within a dynamic reaction zone under carefully controlled conditions of gas to water feed ratio, system pressure and temperature to eliminate processing anamolies.

15 Claims, 1 Drawing Figure

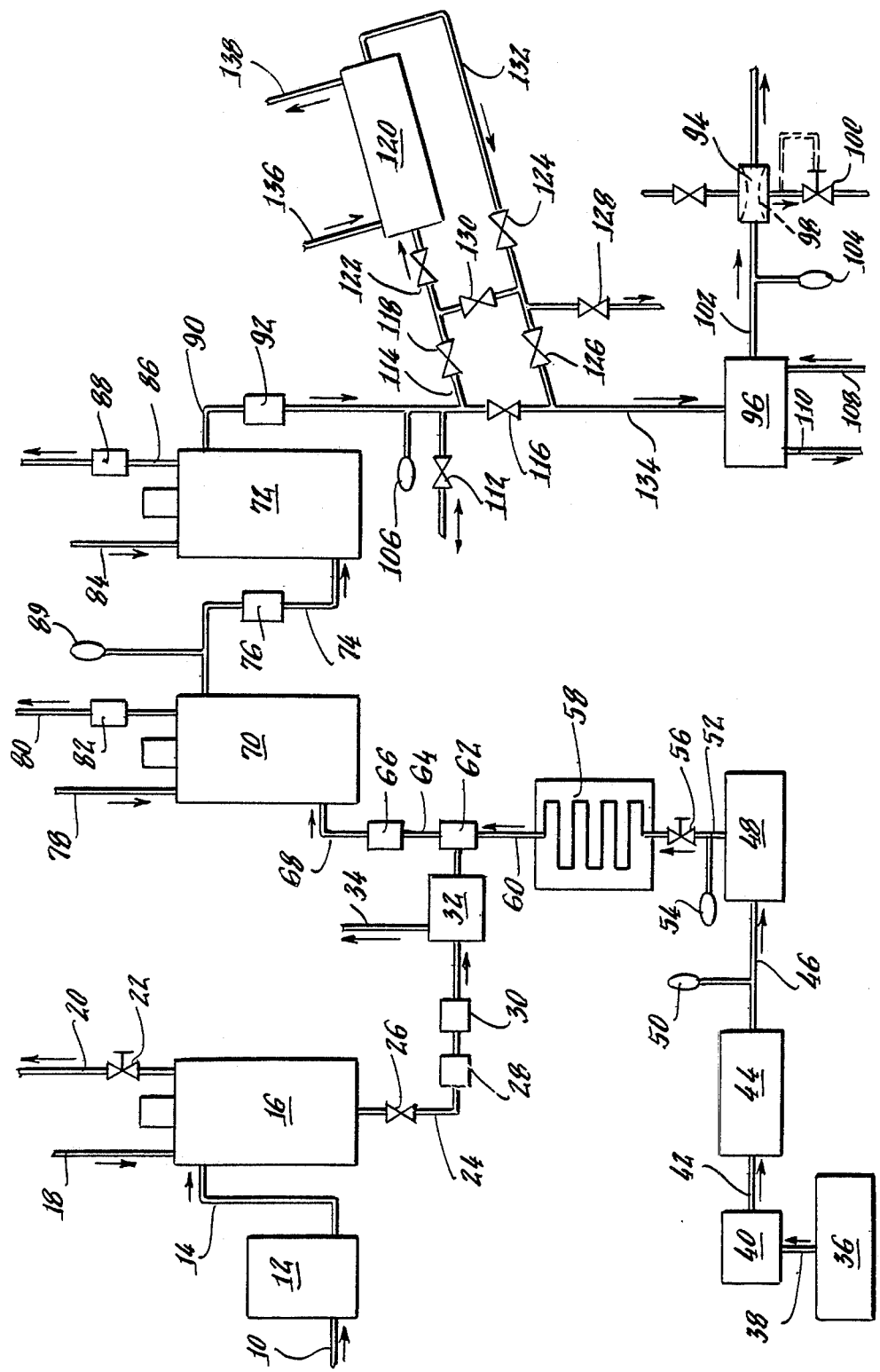

PROCESS FOR PREPARING A GASIFIED ICE PRODUCT

DESCRIPTION

1. Technical Field

The present invention relates to gasified ice products; and, more particularly, to an improved process which enables the production of gasified ice products which have uniform gas contents and structural properties.

Gasified ice products are known which, due to the binding of the gas within a stabilized gas hydrate, have enabled delivery of high volumes of gas from relatively small volumes of ice. These products have shown potential for storage and transport of gases of many types. Typically, the gas will be carbon dioxide and the product will be employed to carbonate and aqueous liquid in the simplified home preparation of carbonated beverages. Unfortunately, products having commerically desirable gas contents heretofore have been difficult to produce efficiently, have varied widely in gas contents between runs and within a single run, have released gas unevenly, and have required additional processing to attain the desired mechanical strength.

In its simplest form, the process for preparing gasified ice products has comprised contacting aqueous liquid with gas under high pressure for a sufficient period of time to form a desired level of gas hydrate, and then cooling to freeze the remaining unreacted liquid and entrap gas hydrate.

It would appear to be desirable to freeze the product in a chamber separate from the reactor to achieve the advantage of controlling product shape and appearance for packaging; however, experience has shown that the products differ so widely in terms of gas content and are so subject to fragmenting during shipment or storage, or popping when placed in an aqueous liquid for use, that it has been necessary in the past to finely divide the product and then reshape it.

While the production of gasified ice products by continuous processing has been disclosed wherein a mixture of a suitable gas and water are passed through a scraped-surface heat exchanger under conditions conducive to forming gas hydrate, the apparent straightforward simplicity of continuous processing has not been realized in commercial practice. The results achieved by current continuous processing technology have not enabled the manufacture of a uniform, reproducible and stable gasified ice product.

2. Background Art

Barner et al in U.S. Pat. Nos. 2,975,603, 3,086,370 and 3,217,503 disclosed a process for producing gasified ice characterized by an extended storage life and its ability to form effervescent aqueous solutions upon mixture with aqueous liquid. According to one aspect of the disclosure, the gasified ice was prepared by subjecting aqueous liquid to a suitable pressure of at least about 200 psig and preferably less than 600 psig; maintaining the aqueous liquid and the carbon dioxide in contact for a time sufficient to permit absorption in the liquid of the gas in bound form and formation of gasified ice containing at least about 25-27.5 milliliters of gas per gram of ice; and withdrawing the gasified ice.

According to a specific example disclosed in U.S. Pat. No. 2,975,603, water was contacted with carbon dioxide at a pressure of 400 psig. The pressurized reaction vessel was placed within a constant temperature bath maintained at 0° C. during the period of contact. After 75 minutes, the vessel was removed from the bath, cooled to freeze the contents, depressurized and opened. The contents were removed, and the solid ice was stored for 24 hours at −10° C. to effect degasification. Testing of the degasified product revealed that it had a carbon dioxide content of 75 volumes carbon dioxide per gram of ice. While Barnes et al indicate only that a vigorous evolution of gas was observed, it has been our experience with products prepared in accordance with this general procedure at high gas contents, that the product pops and cracks when placed in water and often splashes water from the container. Moreover, in order to remove the product from the pressure reactor, it is necessary to chip or chisel the ice out of the reactor vessel, resulting in a product with very uneven dimensions.

U.S. Pat. No. 3,086,370 is similar, but additionally discloses that gasified ice products containing other gases such as nitrous oxide, certain sulfur-containing gases, certain chlorine-containing gases, various inert gases and carbon monoxide, could be formed.

A similar disclosure is found in U.S. Pat. No. 3,217,503 which again was a continuation-in-part of the application which resulted in the first-mentioned Barnes et al patent. This patent, however, describes in more detail the method for handling and transporting gasified ice to a desired point of liberation under atmospheric pressure while maintaining it at a temperature below its melting point.

Adler et al in U.S. Pat. No. 3,220,204 stated that while the prior art procedures of Barnes et al produce products which retain significantly high levels of carbonation during refrigerated storage, the products had a tendency to explode or pop (i.e., break apart and disintegrate with a loud noise) at an unpredictable point of time during dissolution. They indicated that when the Barnes et al carbonated ice products were added to water or milk, they frequently exploded in the glass. A less spectacular product was required for commercial success.

Their solution to the problem entailed providing a high liquid surface to gas contact during the preparation of the hydrate. To achieve this, they employed a thin film of water which was subjected to carbon dioxide gas at a pressure and temperature above the eutectic point of the water and at a temperature low enough to form a hydrate. A suspension of hydrate in aqueous liquid was then transferred to a freezing zone and was converted to a stable form by freezing at a temperature below −3° C.

According to Example 1, a mixture of cooled water and carbon dioxide is fed into a scraped-wall heat exchanger at a high ratio of gas to water (calculated from the disclosed data to be a weight ratio of about 0.32). After a residence time of about 2 minutes within the heat exchanger, the reaction mixture exited as a hydrate slush having a temperature of about 1.5° C. The process pressure was 250 psig. After freezing to −3° C., the product exhibited a level of about 50 milliliters of carbon dioxide per gram of ice. Example 2 was similar except that the process pressure was reduced to 150 psig and the ratio of carbon dioxide to water was increased (calculated to be a weight ratio of 0.66). The product of Example 2 was said to contain about 32 milliliters of carbon dioxide per gram of ice.

While it was disclosed by Adler et al that their process produced a carbonated ice product which was better able to withstand surrounding environments to which it would be exposed during packaging, handling and use without popping or exploding, these problems were not eliminated to the extent necessary for a commercially acceptable product. Moreover, while the continuous process showed that it was capable of producing carbonated ice products with practically high levels of entrapped gas, reproducibility both between process runs and within a single process run proved difficult. An added disadvantage was that the products would tend to break apart upon removal from the molds, leaving very little unbroken ice in rod form. In order to prepare products having the desired degree of uniformity and structural strength necessary to survive shipment and reasonable lengths of commercial storage, it was found necessary to subdivide the ice and then reshape it into pieces of uniform size and properties.

Extensive research with the Adler et al process has revealed that while the concept of pressure control is taught by Adler et al and apparently suitable means for obtaining the control are disclosed, there are a number of factors, which are not disclosed by Adler et al, which have been found to be important to the production of a consistent, uniformly-carbonated, non-popping product at practical carbonation levels by a continuous process which minimizes the amount of unusable product. The research has revealed that the processing conditions and apparatus employed by Adler et al make it difficult to meet these criteria on a continous, reproducible basis. And, while Adler et al discloses cutting the product into individual segments, experience has shown that there is such a wide variation in the properties of individual segments, that a commercially practical product can be made only if the product is first ground and then compressed into a briquette such as according to the disclosure of U.S. Pat. No. 3,333,969 to Mitchell et al.

Throughout this evolution of gasified ice products, Mitchell et al disclose in U.S. Pat. No. 3,333,969, that the problem of uneven release of carbon dioxide had persisted. They indicated that an important problem present in the handling and use of carbonated ice, particularly in the lower portion of the 10 to 118 volume range, was the uneven release of carbon dioxide from the carbonated ice. They stated that this problem manifested itself in minor explosions or popping which, while not of dangerous nature where the gas was carbon dioxide, may disturb the user and splatter the liquid in which it was placed. Mitchell et al proposed subdividing carbonated ice into discrete particles while maintaining the temperature of the ice below 0° C., and then compacting the discrete particles to form them into an adhered mass or briquette. Briquetting produced gasified ice products having commercially satisfactory mechanical strength and also substantially eliminated the undesirable, spontaneous popping and exploding phenomena; however, it also resulted in the reduction of the level of carbonation in the final product and a faster rate of loss that from unground ice.

It is apparent from the foregoing discussion of the prior art that the problems of uneven release of gas from gasified ice products, and the ability to obtain uniform carbonation within a given run and on a reproducible basis, have long troubled those skilled in the art. Thus, there remains a need for an efficient, economical process that produces a gasified ice product having satisfactory mechanical strength and a uniform, non-popping gas content, on a reproducible basis.

DISCLOSURE OF INVENTION

In accordance with the present invention, we provide an improved process for preparing gasified ice characterized by a uniform gas content within the range of from about 35 to 60 milliliters of gas per gram of product and a high degree of mechanical strength in the frozen state. Also provided is the product of this process. In its broad aspects, the process comprises: providing a source of liquid water at a temperature below about 5° C.; providing a source of conditionally-stable-hydrate-forming gas at a temperature of about 5° to 10° C.; dispersing the gas within the water at a weight ratio of gas to water within the range of from about 0.10 to about 0.25 to provide a process feed stream; introducing the process feed stream into a dynamic reaction zone at a temperature within about 1° C. of the hydrate formation equilibrium temperature at a preselected process pressure, within the range of from about 300 to about 450 psig, which is maintained within the dynamic reaction zone; maintaining contact between the gas and water under dynamic conditions for a period of time effective to form conditionally-stable gas hydrate and to dissolve gas within the water to an extent effective to provide a uniform, flowable suspension of solid, gas-hydrate, crystal-like particles in a saturated aqueous solution of carbon dioxide; transporting the suspension to a pressurized freezing vessel which is in communication with the dynamic reaction zone and a pressure control means comprising valve means and means for separating occluded gas from liquid and solid components, said pressure control means being capable of controlling the system pressure to within 5 psig of the preselected pressure, closing the freezing chamber; and freezing the suspension under pressure.

In carrying out the process of this invention, the gasified ice products will preferably be prepared from distilled or deionized water because they provide advantages in terms of reproducibility of precise conditions and stability of the final product. While not preferred, the person of ordinary skill in the art may, however, employ various types of solutions, and in the case of food products such as beverages, various materials including sugar, color, flavor, acidulents and the like, knowing that the ease of process control or the stability of the final product may be decreased. Thus, the terms "water" and "aqueous liquid" will hereinafter be employed to include not only chemically pure water per se, but water containing added materials such as those mentioned.

Also by way of definition, the term "dynamic reaction zone" is meant to define a zone wherein vigorous agitation is maintained either by a mechanical stirrer, a scraped-surface heat exchanger, an in-line mixer, or other means capable of maintaining constant relative motion between the gas and liquid within the reaction zone. This term is specifically meant to distinguish from batch-type reactors wherein agitation is maintained for a brief period of time but then terminated while the material continues to react and freeze in a static condition.

Among the gases which are capable of forming conditionally-stable hydrates are those which form hydrates which appear to be characterized by a molecular complex between the gas and water under the controlled conditions of temperature and high pressure. All of the suitable gases exist in the gaseous state at atmospheric pressure at temperatures above 0° C. Additionally, these gases combine with water to form gas hydrates containing six or more moles of water per mole of gas. The hydrates are further characterized by their ability to be stored in essentially stable condition at temperatures below about 0° C. and then be decomposed by melting in an aqueous liquid.

Specifically identified as gases capable of forming conditionally-stable hydrates are various oxides of non metals, such as nitrous oxide; sulfur-containing gases including hydrogen sulfide; chlorine-containing gases, including chlorine and methylene chloride; various inert gases such as helium, argon, krypton, and neon; carbon monoxide; and carbon dioxide. Preferably, the gas will be selected from the group consisting of these, and most preferably will comprise carbon dioxide, nitrous oxide, or chlorine, due to their adaptability to the process and their wide-spread utilities. While not intending to be bound to the specific example of carbon dioxide, the present detailed description will focus on this as exemplary, due to its ready adaptability to use in preparing carbonated beverages for which there appears to be a commercial opportunity.

BRIEF DESCRIPTION OF THE DRAWING

The present invention will be better understood and its advantages will become more apparent when the following detailed description of the best mode for carrying out the invention is read in light of the accompanying drawing wherein:

the FIGURE is a schematic flow diagram of a particularly preferred processing arrangement according to the invention.

BEST MODE FOR CARRYING OUT THE INVENTION

The invention provides a gasified ice product characterized by a uniform gas content within the range of from about 35 to about 60 milliliters of gas per gram of product, a high degree of mechanical strength in its frozen state, a vigorous, uniform evolution of gas when placed in an aqueous liquid, and a quiet, non-explosive character when open to air. In addition to these generalized desirable advantages of individual products according to the invention, the process is capable of providing products of this type within reasonable commercial tolerances on a uniform basis with a minimum of unusable product. The process, in fact, is capable of producing practical quantities of solid, premolded gasified ice products which can be prepared for commercial distribution by simply shaping into suitably-sized individual rods or molding elongated rods and then cutting to a smaller desired length.

The following description will discuss a preferred process where, in the preparation of carbonated ice, a suspension of carbon dioxide hydrate in aqueous liquid is prepared in a pressurized, dynamic reaction zone wherein the reaction is brought to a high degree of completion while maintained within the dynamic zone, is transported to a pressurized freezing vessel in communication with the dynamic reaction zone and also in communication with a pressure control means having the ability to tightly control the overall system pressure, and freezing within a closed chamber. The principles which apply to this particular reaction system can also be applied to the formation of gasified ice products containing other suitable gases.

We have determined according to the invention that close control over all process feed streams and product lines is essential to the production of products having the properties necessary for commercial production on a commercially efficient basis. To achieve the necessary degree of process control, our preferred embodiment provides for the regulation and close monitoring of pressures and temperatures which in the past have been presumed to be self-regulating by virtue of the reaction. It has been determined, however, that the self-regulation of the system operating conditions cannot be relied upon for obtaining good results on a reproducible basis. For example, the control of the inlet gas temperature and pressure have been found to be equally important with the control of the inlet water temperature and pressure.

Referring to the drawing, there is seen inlet water feed line 10 which conveys water to a deionizer 12 of conventional construction and operation. It is preferred that the water either be distilled or deionized. From the deionizer 12, the feed water is fed through line 14 to water feed tank 16. The feed tank is preferably a jacketed holding tank having a heat transfer media such as a 40% solution of propylene glycol providing cooling to the jacket. The heat transfer media is passed through the jacket by means of entrance line 18 and exit line 20, with the flow being controlled by valve means 22.

The water will preferably be added to the process as a liquid without any significant amount of ice crystals formed therein and will have a temperature below about 5° C. Where significant amounts of ice crystals are present, problems of metering and freeze-ups can occur. Most preferably, the water is maintained in a liquid state at a temperature of from about 0° to about 2° C.

From the tank 16, the water passes through line 24 and valve 26 to a strainer 28 which removes any particulate material which may be present. From strainer 28, the water flow is measured by a flow meter 30 prior to passage to pump 32. The pump 32 is capable of metering the flow of water to the system at constant rate and at a constant pressure. Pressure from an external source (not shown) is maintained on the pump by means of line 34 to assure constant pressure for the water exiting pump 32. It is preferred that the pump be capable of continuously feeding water, and thus process feed stream 68, at a flow rate which varies by no more than about 5%, preferably no more than 2%.

Similarly with the feed water supply means described above, the pressure and temperature of the gas supply to the system is also closely controlled. To achieve this according to the preferred embodiment, liquified carbon dioxide is held within a suitable receiver 36 and passed by line 38 to pump 40 capable of pumping the liquified gas via line 42 to a vaporizer 44 of conventional construction. From the vaporizer 44, the now gaseous carbon dioxide is passed by via line 46 to a gas surge tank 48. The pressure within line 46 is indicated by a suitable pressure sensing device 50.

The provision of a surge tank 48 for the gaseous feed is preferred because it was determined that in prior procedures, anomalies in gas feed flow would often cause a series of problems downstream throughout the reaction and freezing stages. By providing the surge tank 48 which feeds the gas via line 52 past pressure gauge 54 and gas mass-flow control valve 56, it is now possible to better control the pressure of the gas supplied to the process. The pressure of the gas supply to cooler 58 at a pressure no higher than 200 psig greater than the predetermined process pressure which will be employed downstream in the reaction zone, freezing tube and process pressure control means.

In the gas cooler 58, the gas is preferably brought to a temperature of from about 5° to 10° C., and most preferably a temperature of from about 7° C. to about 8° C. The gas cooler can comprise a heat exchanger of conventional construction for cooling gaseous materials.

Gas from the gas cooler 58 is then passed via line 60 to dispersing means 62 which also receives water from pump 32. The dispersing device 62 can be a sparger, an in-line mixer, or any other device suitable for finely dispersing the gas within the water. Preferably, the dispersing device will be a sintered sparger, such as the type made from sintered particulate polymers or metals having a pore size within the order of 0.5 microns.

It is preferred that the temperatures be controlled within the ranges described so that a maximum amount of carbon dioxide can be immediately dissolved into the water such that reaction will proceed at the most rapid rate when the product reaches the reaction zone. And, because of the careful temperature control of both the gas and water feeds, the temperature of the process feed stream comprising water containing both dissolved and dispersed gas therein can be readily controlled to a temperature within about 2° C. of the hydrate formation equilibrium temperature at the preselected pressure for the reaction. This temperature can readily be determined by experimentation with the pressures and reactants desired. And, in the case of carbon dioxide, reference can be made to the $CO_2$-water-hydrate phase diagram described in commonly-assigned copending patent application, Ser. No. 249,543 filed Mar. 31, 1981 now U.S. Pat. No. 4,347,707 issued 9-7-82 and entitled "Gasified Ice Product and Process Having Improved Storage Stability". As shown in the drawing, the feed stream is passed from a first dispersing device 62 via line 64 to a secondary dispersing device 66 which can be employed if desired. In one preferred embodiment, device 66 can be a static mixer where the device 62 is a sintered metal sparger.

An important discovery according to the invention is that the weight ratio of the gas to the water in the process feed stream should be maintained within the range of from about 0.1 to about 0.25. Preferably, the ratio will be maintained within the range of from about 0.14 to about 0.18. And, it is also important to maintain this value constant with a fluctuation of no more than about 10%, preferably less than about 5%.

Where the ratio is below the minimum level within the range, the degree of hydrate formation will be below those levels where practical commercial products can be achieved, it being virtually impossible to achieve a product containing more than 35 milliliters of carbon dioxide per gram of product. Where the ratio is above the ranges indicated, the reaction will be so incomplete after leaving the dynamic reaction zone (unless the time of exposure is significantly increased) that the rate of flow throughout the process become sporadic, causing unexpected variations in process pressure and other anomalous results, not fully understood, which have the net effect of providing a final product which varies widely in its gas content and characteristics in terms of physical strength, uniform gas release and stability. A high gas water ratio could also increase the solids level to the point of causing difficulties with transport of the slurry. Accordingly, the ratio of gas to water must be carefully controlled prior to passing it via line 68 to the dynamic reaction zone which in the figure is shown to employ two scraped-surface heat exchangers 70 and 72 connected in series by means of line 74. Naturally any number of heat exchangers may be utilized, the major consideration being the amount of heat exchange surface area which is present.

The pressure within the dynamic reaction zone is maintained at a constant value within the range of from about 300 to about 450 psig, preferably within the range of from about 325 to about 400 psig. This is a factor in controlling the rate of reaction. When employing the feed ratio of gas to water within the ranges given above, pressures below the preferred ranges will yield products which do not have the minimum level of about 35 milliliters of gas per gram of product within acceptable reaction times. And, pressures above the maximum will result in the sporadic formation of high levels of gas hydrate which tend to cause erratic flow problems within the dynamic reaction zone and subsequent processing lines. Accordingly, maintenance of the pressure within the preferred range is important to the production of high quality product on a reproducible basis.

The pressure maintained within the dynamic reaction zone is controlled by pressure control means in communication with the reaction zone as will be described later. During the stage of transporting the process reaction mixture from the reaction zone to the freezing chambers, the pressure control means, to be described later, is also maintained in communication with the freezing chamber.

Refering again to the scraped-surface heat exchangers 70 and 72, which comprise the dynamic reaction zone in the process arrangement shown in the drawing, an in-line mixer 76 is employed in transfer line 74 to maintain the product in a consistently-uniform flowable condition as it passes from one scraped-surface heat exchanger to the other, and to further aid in solubilizing the dispersed gas into the liquid.

The scraped-surface heat exchangers can be of conventional construction such as a Votator scraped-wall heat exchanger (available from Chemetron Corp., Louisville, Ky.) or a Contherm unit (available from Alfa Laval, Inc., Fort Lee, N.J.). Both scraped-surface heat exchangers 70 and 72 are jacketed with a heat exchange medium such as a propylene glycol solution which is circulated through the jacket to provide cooling and heat removal from the exothermic reaction as the process reaction mixture is continuously scraped from and replaced onto the internal surface of the heat exchangers 70 and 72. Thus, as shown in the drawing, line 78 feeds heat exchange media to the jacket of heat exchanger 70 and line 80 having flow control means 82 therein removes the heat exchange media therefrom. Similarly, heat exchanger 72 is supplied with heat exchange media by means of line 84, with the return line 86 having a flow control means 88 positioned therein.

In addition to the in-line mixer 76 in line 74, the pressure is constantly monitored by means of a suitable pressure sensing device 89. To further assure continuous, uniform flow of the process stream from scraped-surface heat exchanger 70 to scraped surface heat exchanger 72, care is taken to maintain uniform, smooth bends within line 74 which is also maintained free of internal obstructions. Preferably, this process feed line and all those downstream lines for transporting the suspension of gas hydrate particles will be free of obstructions and will be positioned to provide bends of no less than a 6 inches radius.

Contact is maintained within the dynamic reaction zone for a period of time effective to form conditionally-stable gas hydrate and to dissolve gas within the water to an extent effective to provide a uniform, flowable suspension of solid gas hydrate crystal-like particles in a saturated aqueous solution of the gas, typically carbon dioxide. Accordingly to this invention, contact or residence within the dynamic reaction zone is kept between two and eight minutes, preferably between 3 and 5 minutes and will typically be around four minutes. The residence time will usually be divided equally among two or more reaction vessels such as scraped surface heat exchangers 70 and 72. Preferably, the contact under dynamic conditions within the reaction zone is maintained for a period of time effective to substantially eliminate bubbles of gas from the suspension. While the absolute elimination of gas bubbles is not essential to the invention, primarily due to the control of the process feed stream and the pressure control means downstream of the reactor, it is important to prevent undue quantities of gas from being transported downstream of the reaction zone for the continuance of reaction in the absence of dynamic conditions, since this may cause sporadic fluctuations in the quantity of hydrate produced. If desired, a slight glass 92 or other measurement device can be employed in line 90 to enable close monitoring of the rheological properties of the suspension.

The suspension is passed from the dynamic reaction zone through line 90 which is continuously maintained in communication with a pressure control means which comprises a valve means 94 and a means 96 for separating occluded gas from liquid and solid components. The pressure control means is capable of controlling the system pressure to within 5 psig of the preselected process pressure. The valve means is preferably a pneumatically-operated, self-adjusting back-pressure valve which is capable of closely controlling the process pressure. The valve has a flexible internal diaphragm indicated in phantom lines 98 and has a gaseous fluid control means 100 which is operative to maintain the proper process pressure.

As shown in the drawing line 102 provides communication between the means 96 and valve means 94. Within line 102, another pressure measuring device 104 is preferably provided. Likewise, a pressure measuring device is preferably provided in line 90 as shown in the drawing as 106.

The means 96 which separates the occluded gas from liquid and solid components is preferably a jacketed tank having sufficient capacity to handle flow rates for this specific process. Heating fluid, such as 100° F. water will be passed through the outer jacket of the tank to melt incoming suspension and thereby release gas therefrom. By separating the gaseous components from the solid and liquid components, we have found that it is possible to avoid intermittent pressure fluctuations due to areas of concentrated solid material within the suspension which in the past have caused wide fluctuation in process pressure. The medium for heating the jacket of the means 96 is supplied as shown in the drawing via line 108 and withdrawn via line 110. Separating means 96 may contain a bottom drain valve (not shown) to remove liquid either during or after operation. Such liquid removal may be necessary during continuous operation to prevent liquid from passing to valve means 94.

The freezing chamber 120 can be positioned either vertically or horizontally. It has been found quite unexpectedly, however, that the yield of unbroken solid ice, suitable for cutting into lengths of suitable size for packaging, is improved where the tubes are positioned horizontally. Preferably, the freezing chamber will comprise an elongated cylinder positioned at a angle of from 0° to about 30° from the horizontal. Where the amount of solid, severable carbonated ice is produced in this manner, a large amount of a highly attractive product ice can be prepared. Any ice which does not maintain its structural stability in solid form can be ground and then recompacted as is known to the art.

The final stage in processing relates to the freezing of the suspension to form a solid gas hydrate-containing product covered in a protective layer of solid water ice. This coating may be saturated with gas and result from a slight surface melting of the product within the freezing chamber. The water-ice coating may also include a layer which is applied to the product after or as it is removed from the freezing chamber. Conventional water spraying or dipping techniques may be used for this purpose.

According to the arrangement shown in the FIGURE, a bleed point 112 is positioned in line 90 for use when needed. From line 90, it is possible to direct flow into line 114 by closing valve 116, opening valve 118 and then providing direct communication between the freezing chamber 120 and the reaction zone and the means for controlling pressure. To direct flow through the freezing chamber 120, fill valve 122, vent valve 124 and valve 126 are all opened while bleed valve 128 and cross flow valve 130 are closed.

Under steady state conditions, the pressure within the freezing chamber 120 will be stabilized by virtue of its communication with the reaction zone and the pressure control means to the predetermined process pressure. Material will flow into the freezing chamber 120 until the chamber is filled and will then pass therefrom via line 132 to line 134 to the pressure control means downstream. When liquid starts to overflow from the valve 94, it is preferred to maintain flow of suspension to the freezing chamber for another minute or so to assure uniformity of the product therein. At that time, flow to the freezing chamber 120 is terminated and flow to a similar freezing chamber (not shown) is started in the same manner, by closing and opening the appropriate process line valves.

The freezing chamber 120 itself can be suitably sized to provide either individually molded product portions or a larger piece which is cut to size. Typically, the chamber 120 will have an elongated shape, such as a long tube having a diameter of from about 1 to 7 inches, preferably from about 2.5 to about 4.5 inches, and a length of up to about 20 feet or more. Preferably, the internal surface of the freezing chamber will be smooth and corrosion resistant, and will permit the simplified freezing and demolding of product.

To faciliate both freezing and demolding, the freezing chamber is preferably jacketed and heat exchange media is passed through the jacket, entering by means of line 136 and being withdrawn by means of line 138. The product is preferably frozen by cooling in a stepwise manner, as per the aforementioned application, Ser. No. 249,543, to a temperature of −10° C. Upon stabilizing the frozen product the pressure is released to atmospheric conditions and a warm heat exchange medium applied to the tube jacket to cause a surface melt of the product thereby releasing it from the tube.

The carbonated ice prepared in the above manner can be packaged in a suitable container such as a can or styrofoam cup. When packaged in containers of this type, the carbonated ice will provide a high degree of storage stability at ambient pressure and at temperatures within the range of from about $-5°$ to about $-20°$ F. for a period of time in excess of 6 months. Along with the carbonated ice, in the same package or in a separate or adjoining package, there may be provided a composition for preparing a soft drink such as the kind which comprise a color, flavor, an edible acidulent, and sweetener, all of these ingredients being present in the amounts effective to provide the desired taste and eye appeal.

The following example is presented for the purpose of further illustrating and explaining the present invention and is not to be taken as limiting in any regard. Unless otherwise indicated, all parts and percentages are on a weight basis.

EXAMPLE 1

This example illustrates the preparation of a carbonated ice product according to the present invention employing a process arrangement as shown in the FIGURE. To achieve the results which have been established as optimum, the system is set to achieve the operating parameters set forth in the following table:

| OPERATING PARAMETERS | VALUE |
| --- | --- |
| Water flow rate | 4.5 #/min |
| System pressure | 350 psig |
| $CO_2/H_2O$ ratio (wt.) | 0.16 |
| Feed water temperature | 32° F. |
| Temperature at the outlet of water pump 32 | 33° F. |
| Temperature at the outlet of sparger 62 | 41° F. |
| $CO_2$ pressure at the inlet of gas controller | 500 psig |
| $CO_2$ (g) temperature at the outlet of the gas cooler 58 | 45° F. |
| Glycol heat exchange fluid inlet (supply) temperature at scraped-surface heat exchangers 70 & 72 | 18° F. |
| Glycol outlet temperature at scraped-surface heat exchangers 70 & 72 | 25° F. |
| Glycol flow rate thru scraped-surface heat exchangers 70 & 72 | 2 gpm |
| Product temperature at outlet of scraped-surface heat exchangers 70 & 72 | 42° F. |

The process is initially started by preparing the carbon dioxide and water feed systems for flow and then starting the flow of water through the system. At this point, the scraped surface heat exchangers which in this case are Votator units, having an internal surface area of three square feet, are started at a speed of 750 rpm. The system pressure is allowed to build and the back pressure valve 94 is set to the established system pressure of 350 psig. Once the predetermined pressure is reached, the carbon dioxide flow is started and regulated by means of the controller 56 to maintain the proper flow rate to achieve the desired ratio of gas to water of 0.16. The gas temperature is maintained at a temperature of about 45° F. by maintaining a cold water flow (not shown) to heat exchanger 58. Then, the heat exchange medium is begun to the jackets of both of the Votator heat exchangers operating at a shaft rpm of 750.

The system is allowed to stabilize for a period of time sufficient to achieve steady state operation. For stabilizing, valves 118, 126 and 130 are opened and valves 116, 128, 122 and 124 are closed. When the system has reached steady state operation, valve 130 is closed and valves 122 and 124 are opened on the freezing tube which has been pressurized to 350 psig to permit filling thereof to begin. In this particular example, the freezing tube has a diameter of 2.5 inches and the length of 10 feet. While filling, the system pressure is maintained at a constant 350 psig. Also, while filling the freezing tube, a 40% solution of propylene glycol in water at a temperature of 18° F. is supplied to the jacket of the freezing tube.

Filling is allowed to continue until liquid starts to overflow at the outlet of the back pressure valve 94 indicating that the tube is filled. The hydrate is permitted to continue to flow for an extra minute after which period of time valves 122 and 124 are closed and valve 130 is opened. The feed at this point in time can be switched to another freezing tube.

Supply of 18° F. propylene glycol solution to the jacket of the freezing tube is continued until the core temperature of the product reaches 32° F.; and, at that point, the pressure is gradually reduced to 250 psig and colder propylene glycol, at a temperature of 0° F., is then supplied to the jacket of the freezing tube. Freezing is completed over a period of about 30 minutes while maintaining the product within the closed freezing tube.

When the core temperature of the carbonated ice reaches 15° F. or below, the product is ready to be demolded. The pressure on the freezing tube is then gradually relieved. The tube is then opened at the lower most end and the glycol supply to the tube is warmed to 85° F. to permit the product to slide out.

EXAMPLE 2

The following example presents a comparison of results obtained by freezing a series of product suspensions prepared, according to Example 1, in tubes positioned either horizontally or vertically. The horizontally positioned tube was at a 15° angle to the horizontal. The results are as follows:

| AVERAGE GAS CONTENT (cc/gram) |
| --- |
| Horizontal Tubes |
| 45.4 |
| 45.8 |
| 47.5 |
| 44.4 |
| Vertical Tubes |
| 41.9 |
| 40.1 |
| 41.6 |
| 40.6 |

Yield of solid puck-shaped product (1–1½″ thick) after demolding and cutting is about 2.5 times greater for the horizontal tube than it is for the vertical tube.

The above description is for the purpose of teaching the person of ordinary skill in the art how to practice the present invention. This description is not intended to detail all of the obvious modifications and variations of the invention which will become apparent to the skilled worker upon reading. However, applicants do intend to include all such modifications and variations within the scope of their invention which is defined by the following claims.

We claim:

1. A process for preparing gasified ice characterized by a uniform gas content within the range of from about 35 to about 60 milliliters of gas per gram of product and a high degree of mechanical strength in the frozen state, which comprises:

providing a source of water at a temperature below about 5° C.;

providing a source of conditionally-stable-hydrate-forming gas at a temperature of less than about 10° C. wherein all lines for transporting the suspension of gas hydrate crystal-like particles are maintained free of obstructions and are positioned to provide bends of no less than a 6-inch radius;

dispersing the gas within the water at a weight ratio of gas to water within the range of from about 0.14 to about 0.18 to provide a process feed stream;

introducing the process feed stream into a dynamic reaction zone at a temperature within about 1° C. of the hydrate formation equilibrium temperature at a preselected process pressure, within the range of from about 300 to about 450 psig, which is maintained within the dynamic reaction zone;

maintaining contact between the gas and water in the feed stream under dynamic conditions for a period of time of from 2 to 8 minutes and effective to form conditionally-stable gas hydrate and to dissolve gas within the water to an extent effective to provide a uniform, flowable suspension of solid gas hydrate crystal-like particles in a saturated aqueous solution of carbon dioxide;

transporting the suspension to a pressurized freezing vessel which is in communiction with the dynamic reaction zone and a pressure control means, comprises an elongated cylinder positioned at an angle of from 0° to 30° from the horizontal, and valve means and means for separating occluded gas from liquid and solid components, said pressure control means being capable of controlling the system pressure to within 5 psig of the pre-selected pressure;

closing the freezing chamber; and, freezing the suspension under pressure.

2. A process according to claim 1 wherein the contact under dynamic conditions is maintained for a period of time effective to substantially eliminate bubbles of gas from the suspension.

3. A process according to claim 1 wherein the freezing chamber shapes the gasified ice into an elongated rod, and the rod is cut into a plurality of smaller lengths.

4. A process according to claim 1 wherein the contact under dynamic conditions is maintained for from 3 to 5 minutes.

5. A process according to claim 4 wherein the process pressure is maintained within the range of from about 325 to about 400 psig.

6. A process according to claim 1 wherein the feed water has a temperature of from 0° to 2° C. and the feed gas has a temperature of from 7° to 8° C.

7. A process according to claim 1 wherein the gas is fed from a surge tank maintained at a pressure no higher than 200 psig greater than the process pressure.

8. A process according to claim 1 wherein the water feed stream is fed continuously with a variation in flow rate of no more than 5%.

9. A process according to claim 1 wherein the suspension of solid gas hydrate crystal-like particles is fed alternately to one of a plurality of freezing chambers.

10. A process according to claim 1 wherein the temperatures throughout the system are controlled to prevent fluctuation by more than 5° C. at any point in the process.

11. A process according to claim 1 wherein the suspension of gas hydrate crystal-like particles is frozen to a temperature of less than about $-10°$ C.

12. A process according to claim 1 wherein the gas is dispersed into the water by passing it through a sintered sparger.

13. A process according to claim 1 wherein the water is distilled or deionized water.

14. A process according to claim 1 wherein the gas is carbon dioxide.

15. A product prepared according to the process of claim 1.

* * * * *